125,252

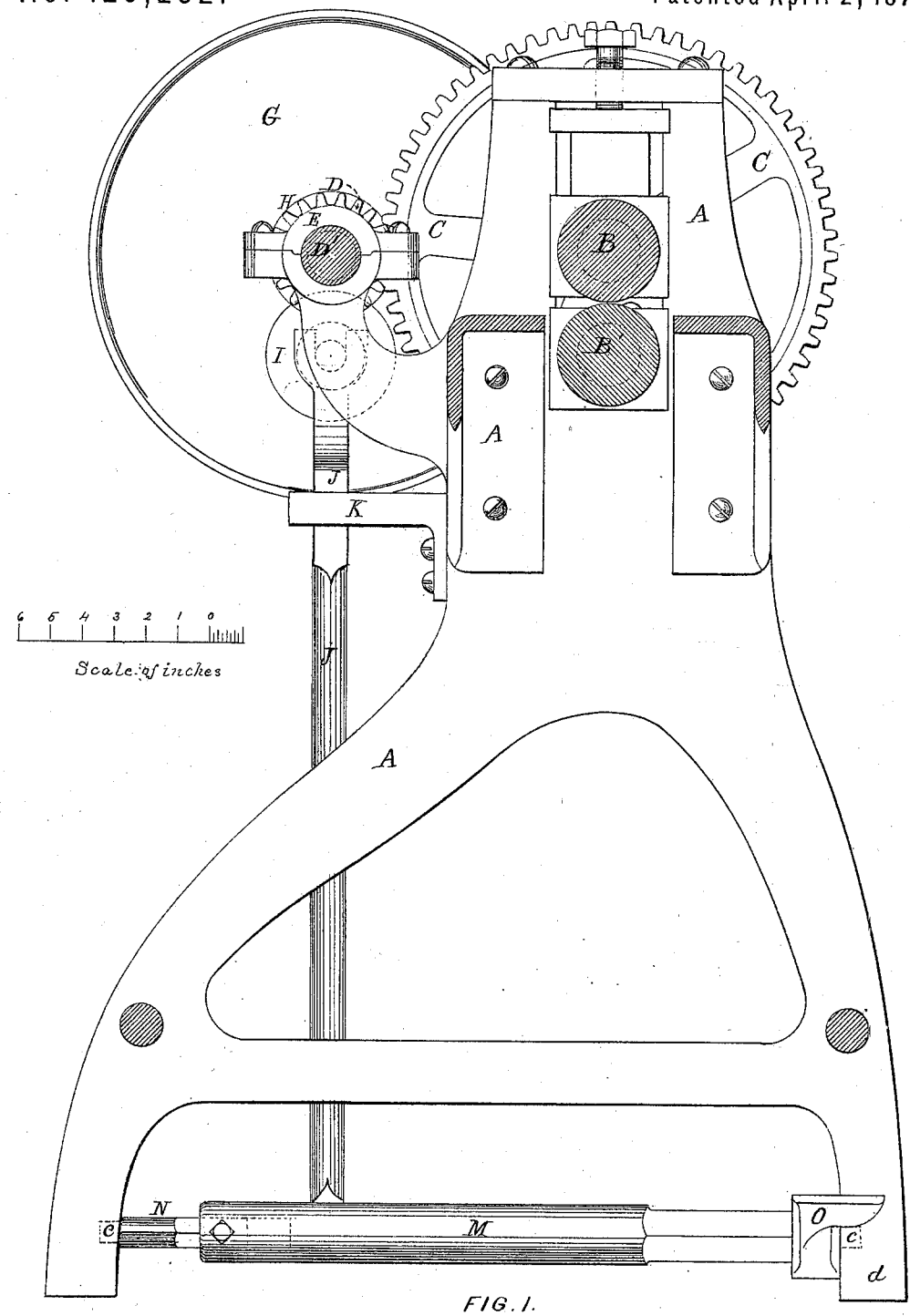

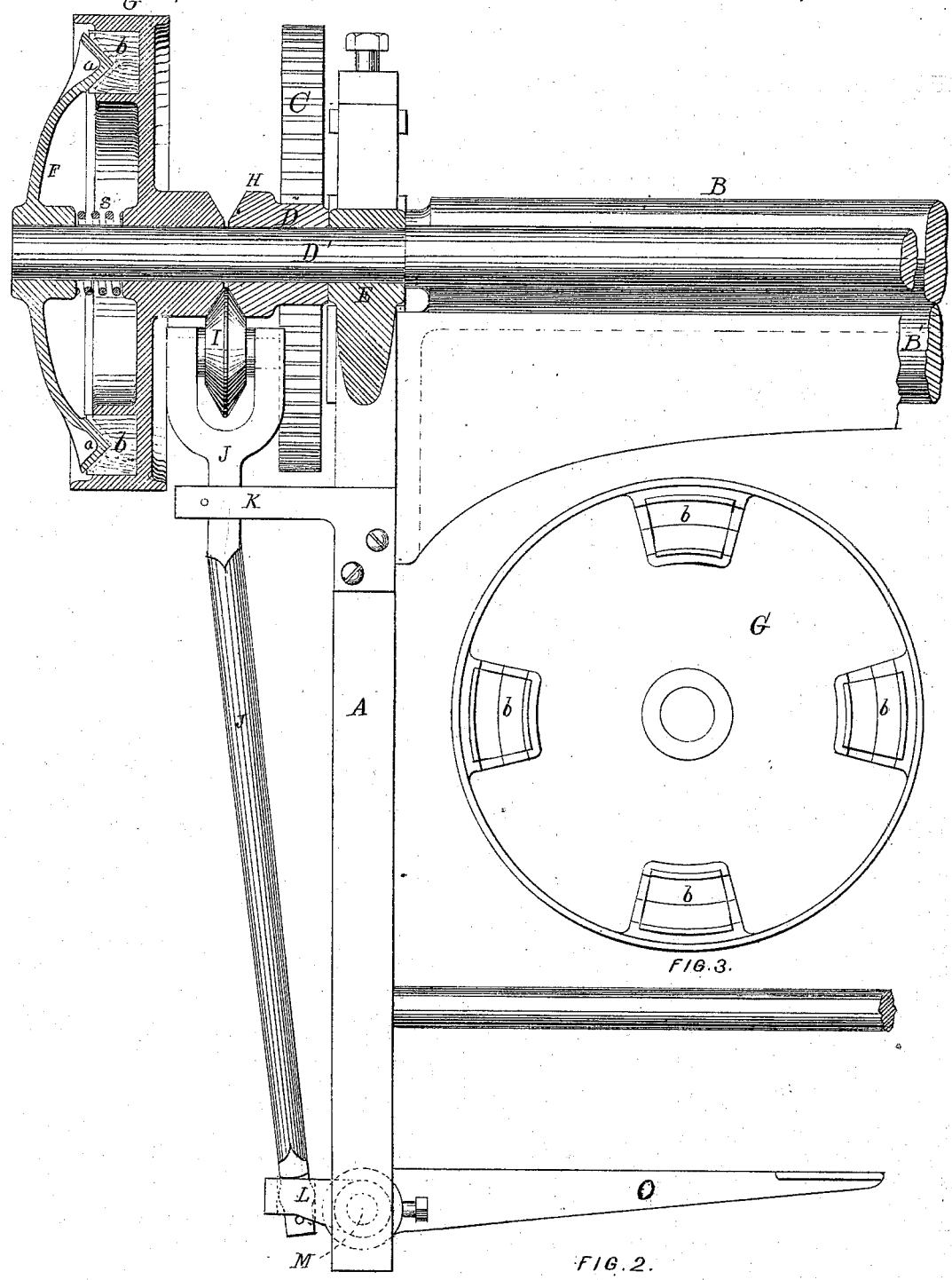

UNITED STATES PATENT OFFICE.

CYRUS W. BALDWIN, OF BOSTON, MASSACHUSETTS, ASSIGNOR TO AMERICAN BOOT AND SHOE MACHINE WORKS, OF SAME PLACE.

IMPROVEMENT IN SHIPPING APPARATUS.

Specification forming part of Letters Patent No. 125,252, dated April 2, 1872.

Specification describing a new and useful Shipping Apparatus for engaging and disengaging a friction-pulley or clutch, invented by CYRUS W. BALDWIN, of Boston, in the county of Suffolk and State of Massachusetts.

My invention relates to a means of moving a loose pulley upon its shaft in a direction parallel to its axis, for the purpose of causing it to engage with a disk or friction-pulley secured upon said shaft so as to revolve with it or with a clutch similarly secured thereon; and it consists, first, in the employment of an anti-friction truck, fitted to revolve in suitable bearings in a frame or rod, so arranged as to be capable of a rectilinear motion toward and from the axis of the shaft on which said loose pulley revolves, the outer periphery of said anti-friction truck consisting of two beveled surfaces in the form of a V, one of said surfaces coming in contact with a corresponding surface on a hub which is firmly secured to said shaft, and the other in contact with a corresponding surface on the hub of the pulley, and, by virtue of its wedge-shape, cause the pulley to move upon its shaft in the direction of its length when said trunk is moved toward the center of the shaft, and entirely doing away with end thrust of the shaft. My invention relates, in the second place, to a novel mode of hanging the treadle rocker-shaft, by means of which the truck above mentioned is moved toward or from the center of the pulley-shaft; and it consists in forming said shaft in two parts, the principal or larger one of which has a journal formed upon one end, to fit a bearing cast in the frame, and also has a socket cast in the other end, of suitable depth and shape to receive one end of the other or smaller part of said rocker-shaft, which also has a journal formed on one end thereof, to fit a bearing cast in the other leg of the frame, and so fitted to the socket in the larger part as to form a slip-joint, in such a manner that the two ends of the rocker-shaft may be inserted in fixed bearings cast in the frame, and secured therein, without the trouble and expense of fitting a cap to said bearings. My invention relates, in the third place, to the means employed to cause adhesion between the fixed and loose portions of the friction-pulley; and it consists in the formation in the casting of either the loose or fixed portion of the pulley, of pockets or recesses, arranged at intervals around the axis of the pulley and equidistant therefrom, and filling said recesses with wood, leather, or other suitable adhesive material, the outer ends of said blocks of wood, &c., having a V-shaped groove turned therein concentric with the axis of the pulley, and to fit a corespondingly-shaped annular projection on the other portion of the pulley, as will be more fully described.

In the drawing, Figure 1 is a transverse section of a machine for rolling leather, with my improvements applied thereto. Fig. 2 is a longitudinal section on line $x\ x$ on Fig. 1; and Fig. 3 is an elevation of the loose portion of the driving-pulley, showing the manner of applying the friction-blocks thereto.

A is the frame of the machine, and B and B' are the pressure-rolls. C is a spur-gear; D, a pinion; and D', the pinion-shaft, by means of which the rolls are made to revolve, all constructed and operated in a well-known manner. The pinion-shaft D' is mounted in the bearings E, one on either side of the machine, and has the disk F firmly secured to the outer end thereof, said disk having the annular V-shaped rib $a$ upon its inner face, said V-shaped rib being turned truly concentric with its axis. G is the driving-pulley, fitted to revolve freely on the shaft D', and having a series of pockets or recesses formed between the rim and hub upon the side of the web or spokes, and arranged at intervals around, and equidistant from the axis of the shaft, said pockets being filled with blocks $b$ of wood, leather, or any other suitable adhesive material, and having a V-shaped groove turned therein concentric with said axis and corresponding in diameter and shape to the rib $a$ on the disk F. The hub of the pulley G, opposite to the friction-surface just described, is beveled at an angle of about thirty degrees from a perpendicular. H is a hub or collar, forming a part of the pinion D, and firmly secured to the shaft D', and having a beveled end corresponding with and facing toward that on the hub of the pulley, the two beveled surfaces inclosing an angle of about sixty degrees. Directly beneath the shaft D' is the truck I, the outer periphery of which consists of two beveled surfaces corresponding to the beveled surfaces on the pulley G and hub H, said truck being mounted in the forked end of the rod J, which is guided near its upper end by the forked stand K, the lower end of said rod being connected, by a mortise-and-tenon connection, to the lever L projecting from the outer side of the rocker-shaft M. The rocker-shaft M is made somewhat shorter than the distance between the two feet of the frame A, and is provided with a journal, c, which fits into a hole cast in the inner side of the foot d of the frame A. The opposite end of the shaft M is provided with a square socket, cast or otherwise formed therein, of sufficient depth to give sufficient bearing for the extension piece N, and room for adjusting the same, the piece N being also provided with a journal to fit in a bearing cast or otherwise formed in the foot of the frame, as shown in dotted lines at e. O is a treadle, secured upon the shaft M, and by which the shipping apparatus is operated.

The operation of my invention is as follows: The foot being placed upon the treadle O, the rocker-shaft M is partially rotated, and the truck I is forced upward between the hub H and the hub of the pulley G; and, by virtue of its wedge-shape, and acting upon the hub H as an abutment, causes the pulley G to be moved upon its shaft and forced hard against the V-shaped rib a on the disk F, the ends of the friction-blocks b being forced hard against said rib, and compelling the disk F and shaft D' to revolve with the pulley G, the truck I revolving in its bearings and holding the two parts of the pulley in contact as long as the foot is kept on the treadle. When the foot is removed from the treadle the weight of the rod J and truck I, or the action of the spring, will cause the truck I to fall away from the beveled hubs on the shaft D', and the spiral spring s, placed between the two parts of the pulley, will force them apart, and the pulley G will revolve freely on the shaft D' again.

One great advantage of the use of this shipping device is obviating all end thrust upon the driving-shaft.

What I claim as new, and desire to secure by Letters Patent of the United States, is as follows:

1. As a means of moving a loose pulley or clutch upon its shaft for the purpose of causing it to engage with that portion of the pulley or clutch which is made fast to the shaft, I claim the V-shaped truck I, arranged and operating substantially as herein described.

2. The rocker-shaft M and extension piece N, fitted to a socket in said rocker-shaft for the purpose of facilitating the insertion of the journals thereon into bearings formed in the frame, substantially in the manner described.

3. The friction-blocks b, arranged at intervals around, and equidistant from the axis of one part of a pulley, and having a V-shaped groove formed in the ends thereof, in combination with a circular V-shaped rib, a, on the other part of the pulley, substantially as described.

Executed at Boston this 18th day of January, 1872.

CYRUS W. BALDWIN.

Witnesses:
N. C. LOMBARD,
DAVID T. PRAY.